United States Patent [19]

Usuki et al.

[11] 4,342,814

[45] Aug. 3, 1982

[54] HEAT-RESISTANT ELECTRICALLY INSULATED WIRES AND A METHOD FOR PREPARING THE SAME

[75] Inventors: Takayoshi Usuki; Yukio Endo, both of Tokyo; Kichizo Ito, Chiba; Takao Tuboi, Ichikawa; Shin Kubota, Urayasu, all of Japan

[73] Assignee: The Fujikura Cable Works, Ltd., Tokyo, Japan

[21] Appl. No.: 100,403

[22] Filed: Dec. 5, 1979

[30] Foreign Application Priority Data

| | | | |
|---|---|---|---|
| Dec. 12, 1978 | [JP] | Japan | 53-90441 |
| Dec. 12, 1978 | [JP] | Japan | 53-152647 |
| Sep. 7, 1979 | [JP] | Japan | 54-114222 |
| Sep. 8, 1979 | [JP] | Japan | 54-114740 |
| Oct. 27, 1979 | [JP] | Japan | 54-138946 |

[51] Int. Cl.³ ........................ B32B 27/00; H01B 7/00

[52] U.S. Cl. .................................... 428/383; 428/372; 428/389; 428/391; 174/120 C; 174/120 SR

[58] Field of Search ............... 428/372, 379, 380, 383, 428/384, 387, 389, 391; 174/110 R, 110 A, 110 SR, 110 N, 110 PM, 110 V, 110 FC, 110 S, 110 EP, 118, 120 SR

[56] References Cited

U.S. PATENT DOCUMENTS

| | | | |
|---|---|---|---|
| 2,935,427 | 5/1960 | Hall et al. | 428/384 X |
| 3,291,638 | 12/1966 | Stadlen et al. | 428/384 |
| 3,352,009 | 11/1967 | Cohn et al. | 427/118 |
| 3,425,865 | 2/1969 | Shelton, Jr. | 428/384 |
| 3,442,702 | 5/1969 | Pendleton | 428/384 X |
| 3,446,660 | 5/1969 | Pendleton | 428/384 X |
| 3,565,685 | 2/1971 | Suzuki | 428/384 |
| 4,000,362 | 12/1976 | Kawaguchi et al. | 174/120 S R |

*Primary Examiner*—Lorraine T. Kendell
*Attorney, Agent, or Firm*—Wenderoth, Lind & Ponack

[57] ABSTRACT

A heat-resistant electrically insulated wire has a composite coating layer of a mixture of an inorganic fine powder and an inorganic polymer on a conductor and the composite coating layer has a resinous overcoat layer thereon. The composite coating layer has not artificially been fired, but is adapted to be converted into a ceramic layer when exposed to elevated temperatures during use.

6 Claims, 1 Drawing Figure

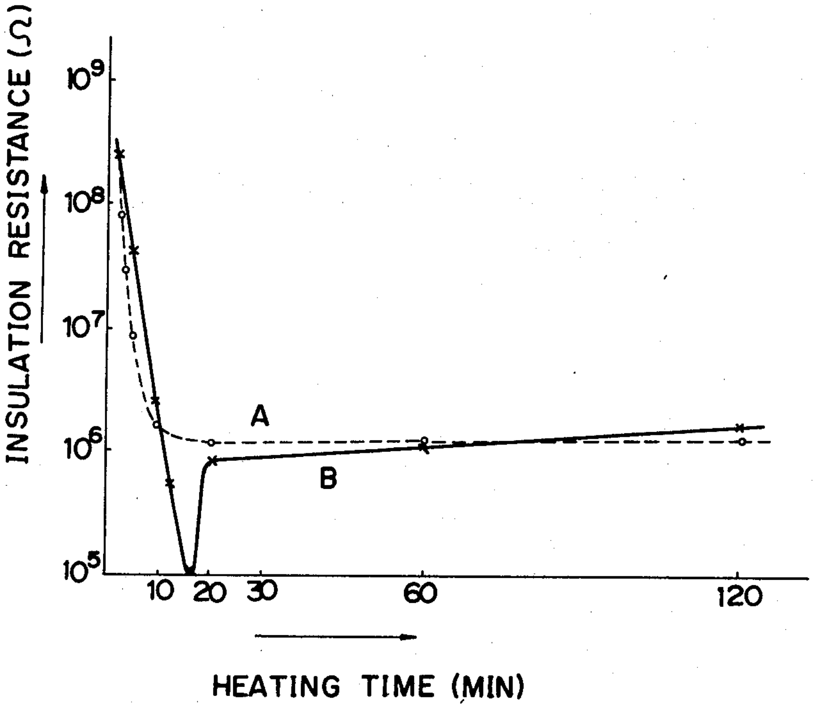
INSULATION RESISTANCE (Ω)
$10^9$
$10^8$
$10^7$
$10^6$
$10^5$
A
B
10
20
30
60
120
HEATING TIME (MIN)

HEAT-RESISTANT ELECTRICALLY INSULATED WIRES AND A METHOD FOR PREPARING THE SAME

BACKGROUND OF THE INVENTION

This invention relates to heat-resistant electrically insulated wires for use as windings and wirings in electric equipment such as motors and electromagnets, and a method for preparing the same.

Recently, electrically insulated wires in the form of a conductor having a heat resistant ceramic coating thereon have been often used in proximity of the core of a nuclear reactor or in a high temperature atmosphere. Since ceramics, however, are generally very hard and fragile, wires having a ceramic coating have a substantially poor flexibility. Such ceramic-coated wires are difficult to carry out mechanical working or fabrication, for example, by bending, and are only applied to limited areas. Cracks often occur in the ceramic insulating coating during handling because of the lack of flexibility, and the ceramic insulating coating tends to peel because of insufficient adhesion between the ceramic coating and the metallic conductor. Such cracked or peeled coatings cannot ensure the satisfactory insulation of wires.

Japanese Patent Application Publication No. 48-2396 (Y. Matsuda et al., 1973) discloses a method for preparing a ceramic insulated wire in which a wire having a green insulating coating layer which has not been fired into a ceramic form or a semi-finished wire is subjected to mechanical working, for example, coil winding before it is fired at elevated temperatures to convert the coating layer into a ceramic layer. A similar method is disclosed in Eugene Cohn et al., U.S. Pat. No. 3,352,009. The coating layer which is to be fired after working may be prepared by either of the following methods:

(1) Onto a conductor is applied a mixture consisting of vitreous fine powder, a binding resin for imparting flexibility to the resultant coating, and a suitable solvent (so-called "enamel frit").

(2) Onto a conductor is applied a mixture consisting of vitreous fine powder, clay and water (so-called "enamel slip"). The resulting coating is then impregnated with a binding resin for imparting flexibility thereto.

In these prior art methods, the resin used as a binder must be completely eliminated in the subsequent firing step. For this reason, the preferred binder is a resin which tends to be readily decomposed and eliminated at relatively low temperature, for example, methacrylic ester resins. Accordingly, the material to be converted into a ceramic form should be a frit which can be sintered or softened and fused at a relatively low temperature approximate to the decomposition temperature of resins. Since such a frit usually contains a substantial amount of alkali metals such as sodium and potassium, the ceramic coating obtained by firing the frit has some drawbacks as poor electrical characteristics at elevated temperatures and low resistance to thermal shock.

To solve the above-mentioned problems, the inventors have attempted to prepare a ceramic insulated wire using as a binder a silicon resin which has a higher decomposition temperature than the prior art resins and is decomposed into a residue capable of binding ceramic particles. The mixture contains inorganic fine powder having improved good electrical insulating properties at elevated temperatures, such as high melting crystal particles and glassy particles, a silicon resin, and a diluent. The mixture is applied onto a conductor and then heated to the curing temperature of the silicon resin, thereby curing the resin. Mechanical working such as coil winding is carried out at this point. Thereafter, the formed wire is heated to an elevated temperature for decomposing the silicon resin to cause the organic contents to disappear and render the coating ceramic, thereby forming on the conductor a ceramic layer entirely and firmly bonded to the conductor. Since this method uses a silicon resin having a high decomposition temperature as a binder for imparting flexibility, the inorganic powder to be converted into a ceramic form may have a high melting or softening point. Accordingly, glassy fine powders which contain only a trace amount of alkali metals such as sodium and potassium may be employed. This ensures the provision of a ceramic insulated wire which has improved electrical properties at elevated temperatures and improved thermal shock resistance as compared with prior art ceramic insulated wires. In addition, the silicon resin allows the resultant ceramic layer to be firmly bonded to the conductor since the residual material resulting from the decomposition of silicon serves as a binder of inorganic powder particles. It is also possible to use inorganic fine powders having an extremely high melting point.

It should be noted that in some types of electrical equipment or in certain operating conditions thereof, heat-resistant electrically insulated wires are not subjected to such a high temperature as requiring insulating ceramic coatings during normal operation, but only during abnormal operation. There is a strong demand for developing a heat-resistant insulated wire adapted for use in such conditions. Continuing researches, the inventors have succeeded in developing a novel heat-resistant electrically insulated wire capable of meeting the abovedescribed requirements.

SUMMARY OF THE INVENTION

Therefore, the primary object of this invention is to provide a heat-resistant electrically insulated wire which during winding process at room temperature or during the subsequent operation at about room temperature, can be handled or operated in the same manner as has been the practice for conventional organic enamel insulated wires, and is adapted to exhibit improved heat resistance required for the ceramic insulated wire only when or after exposed to elevated temperatures.

A heat-resistant electrically insulated wire according to this invention, which attains the above and other objects, comprises a conductor; a composite coating layer circumferentially enclosing the conductor and composed of a mixture of inorganic fine powder and an inorganic polymer; and an overcoat layer circumferentially enclosing the composite coating layer and composed mainly of an organic resin having good mechanical properties such as flexibility and abrasion resistance. The heat-resistant insulated wire of this invention is different from the above-mentioned ceramic insulated wires in that the composite coating layer composed of a mixture of inorganic fine powder and an inorganic polymer has not artificially been made ceramic by any firing treatment. Accordingly, the wire of this invention has a non-fired composite coating layer and an overcoat layer thereon when used or operated at a temperature below the heat resistance temperature of the overcoating resin. When or after exposed to temperatures above the heat resistance temperature of the overcoating resin during use or operation, the wire of this invention exhibits an improved heat resistance as a result of conversion of the composite coating into a ceramic coating.

Another object of this invention is to provide a heat-resistant electrically insulated wire which can be used without interruption even when the temperature rises from a usual low operating temperature to a high level as a result of abnormal operation of electric equipment or the like, without any reduction of the electrical properties, particularly, electrical insulating properties.

A still another objects of this invention is to provide a heat-resistant electrically insulated wire which is adapted to form a good insulating ceramic layer in any event of a rapid temperature rise, a slow temperature rise, or an intermittent temperature rise, thereby achieving satisfactory insulation.

A further object of this invention is to provide a heat-resistant electrically insulated wire which can be readily worked or fabricated into a desired form, for example, by winding on a bobbin for forming a coil. To this end, the overcoat layer may advantageously be provided around the composite coating layer in substantially nonadhered relationship.

A still further object of this invention is to prevent any adverse affect on a heat-resistant insulating layer by decomposition gases resulting from conversion of the composite coating into a ceramic coating due to exposure to elevated temperatures. To this end, the overcoat layer is provided around the composite coating layer in substantially non-adhered relationship as described above and additionally, the overcoat layer may preferably be composed of a mixture of a resin and an inorganic powder.

Still a further object of this invention is to provide a heat-resistant electrically insulated wire which can be used at a temperature ranging from room temperature to elevated temperatures as high as above 750° C.

Still a further object of this invention is to provide a heat-resistant electrically insulated wire having improved electrical insulating properties and a reduced content of residual carbon.

Still a further object of this invention is to provide a method for preparing a heat-resistant electrically insulated wire having improved properties as described above.

BRIEF DESCRIPTION OF THE DRAWING

Other and further objects, features and advantages of the invention will appear more fully from the following description taken in conjunction with the accompanying drawing, wherein:

the single FIGURE is a diagram showing the variation of the insulation resistance of heat-resistant electrically insulated wires of Examples 1 and 2 during rapid heating.

DETAILED DESCRIPTION OF THE PREFERRED EMBODIMENT

The heat-resistant electrically insulated wire according to this invention comprises a composite coating layer which contains inorganic powder and an inorganic polymer. The inorganic polymer serves as a binder for the composite coating layer. When fired at elevated temperatures due to abnormal operation or the like, the inorganic polymer is decomposed into a product which bonds the inorganic powder particles, contributing to the formation of a fired ceramic coating. Examples of the inorganic polymer include silicone resins; modified silicon resins, for example, copolymers of siloxane with methyl methacrylate, acrylonitrile or other organic monomers, or copolymers of silicone resins with alkyd, phenol, epoxy, melamine or other resins; inorganic polymers having a skeleton including silicon, oxygen and one or more elements selected from the group consisting of C, Ti, B, Al, N, P, Ge, As and Sb; and copolymers or mixtures of the above-enumerated inorganic polymers with the above-enumerated monomers or resins. Among a variety of inorganic polymers as described above, the most preferred are those which are highly flexible and include hydrocarbon and other moieties gradually decomposable at temperatures above their heat resistance temperature, particularly heat-resistant silicone resins such as methylphenyl silicone resin, or modified silicone resins such as alkyd silicone resin. The inorganic polymer such as a silicone resin may be used alone as a binder for the composite coating layer although the inorganic polymer may be used in admixture with an organic polymer such as epoxy resin, polycarbonate and phenol resins to improve the mechanical strength of the layer.

The inorganic fine powder included in the composite coating layer should not be sintered or melted at approximately the decomposition temperature of the inorganic polymer used as the binder. The inorganic fine powder should also have good electrical insulating properties. Examples are crystalline powders, glassy powders and mixtures thereof, illustratively, oxides such as alumina ($Al_2O_3$), barium titanate ($BaTiO_3$), calcium titanate ($CaTiO_3$), lead titanate ($PbTiO_3$), zircon ($ZrSiO_4$), barium zirconate ($BaZrO_3$), steatite ($MgSiO_3$), silica ($SiO_2$), beryllia ($BeO$), zirconia ($ZrO_2$), magnesia ($MgO$), clay, bentonite, montmorillonite, kaolin and glass frit, and nitrides such as boron nitride ($BN$) and silicon nitride, and mixtures thereof. The inorganic fine powder particles may have a suitable size depending on the diameter of a conductor although the particle size may preferably be 10 $\mu$m or less. The inorganic fine powder may have uniform particle size distribution. Also a suitable combination of large size particles and small size particles may be used so that the composite coating layer may be dense. The particles are not limited to a spherical shape, and flakes and fibers may also be used. The mixture from which the composite coating layer is formed should contain the inorganic powder, inorganic polymer and optional resin in a given relative proportion. If the amount of the binder consisting of the inorganic polymer and the other resin is too small relative to the inorganic fine powder, the resultant coating layer has a poor flexibility so that cracks may often occur in the coating layer when the wire is wound into a coil. On the contrary, if the binder amount is too large, an excessively large amount of gases will evolve as a result of decomposition of the binder resin rapidly heated to elevated temperatures, causing the coating layer to be blown off. The wire having pin holes in the coating layer shows reduced electrical properties, particularly, reduced electrical insulating properties at elevated temperatures. For this reason, the mixture should contain 10 to 200 parts by weight, preferably 20–60 parts by weight of the inorganic polymer per 100 parts by weight of the inorganic fine powder.

The composite coating layer may be provided around the conductor by extruding the above-formulated mixture around the conductor or by applying to the conductor one or more times a solution of the above-formulated mixture diluted with 20–300 parts by weight of a diluent per 100 parts by weight of the inorganic fine powder. In the latter case, the diluent may be selected from low grade polymers such as polysiloxane, modified siloxanes and other inorganic polymers, low grade organic polymers, and organic solvents such as toluene and xylene. An excessive amount of the diluent will cause inorganic fine powder particles to settle from the solution. On the contrary, a smaller amount of the diluent will result in a viscous solution. It is difficult to apply such excessively diluted or viscous solutions to the conductor uniformly. Accordingly, the blending proportion of the diluent may preferably fall within the above-prescribed range.

The mixture provided on the conductor as by coating or extruding, is then at least partially cured into a composite coating layer by evaporating the diluent and/or heating. Heat curing or partially curing may generally be carried out at a temperature of 150°–500° C., preferably at a temperature of 200°–400° C. although the heating temperature depends on the particular inorganic polymer used. The heating time for curing to take place may be suitably selected in accordance with the diameter of the conductor. In the case of extrusion, the composite layer extruded may be stood to cool or cooled in water.

The composite coating layer may preferably have a thickness of 1–100 μm. The ceramic layer which is subsequently formed from a thinner composite coating layer when it is heated to elevated temperatures during use has a thickness insufficient to ensure insulation at elevated temperatures. Coating having a thickness of more than 100 μm will reduce the flexibility of the wire and render the composite coating layer soft, reducing the abrasion resistance thereof.

The conductor on which the composite coating layer is applied or extruded may preferably be a heat resistant conductor, for example, of copper plated with heat-resistant metals such as nickel, silver and alloys thereof, nickel- or stainless steel-clad copper, silver, silver alloys, platinum, gold, nichrome and the like. A copper conductor may also be used in the event wherein the wire is exposed to elevated temperatures only for a limited period of time or used under a non-oxidizing atmosphere. Further, the conductor may be oxidized at the surface in order to enhance the adhesion between the conductor and the ceramic layer at elevated temperatures, if desired.

The composite coating layer may be of either a single or a multiple layer structure. A thin intermediate layer may be formed between the conductor and the composite coating layer, the intermediate layer being composed solely of an inorganic polymer or of a mixture of an inorganic polymer and a resin both selected from the above groups listed for the composite coating layer. With such an arrangement, since the binder component or inorganic polymer which is the same as in the composite coating layer is present between the conductor and the composite coating layer, the coating layer is firmly adhered to the conductor, improving the wear resistance and flexibility of the entire wire. When the composite coating layer is converted into a ceramic layer upon exposure to elevated temperatures during use, the decomposition product of the intermediate layer remains as a binder between the conductor surface and the ceramic layer, contributing to an improvement in abrasion resistance. The intermediate layer may preferably have a thickness of 1–5 μm. If the thickness exceeds 5 μm, the silicone or similar resin of the intermediate layer evolves a large volume of gases upon decomposition at elevated temperatures, and the gases tend to escape from within the coating layer, thereby causing numerous pin holes in the coating layer. It is sometimes possible to provide the composite coating layer sandwiched between two intermediate layers. It is also possible to provide plural pairs of intermediate and composite coating layers. The sandwich and alternate laminate structures provide an improvement at least equal to that described above.

The heat-resistant electrically insulated wire of this invention is completed by applying a resin coating over the composite coating layer enclosing the conductor. The main purpose of the overcoat layer is to protect the underlying composite coating layer during mechanical working or fabrication such as coil winding. Illustratively, the overcoat layer prevents the composite coating layer from peeling due to the friction between adjacent portions of the wire or between the wire and the adjoining part during working such as coil winding. Differently speaking, the overcoat layer improves the workability of the wire. The resin used in the overcoat layer should have enough flexibility and abrasion resistance so that it may not be damaged during mechanical working. Further, the resin should have heat resistance so that it may endure usual operating temperature for a long period of time. Under particular conditions wherein temperature rapidly rises as a result of abnormal operation or the like, the overcoat layer of a relatively readily pyrolyzable resin will temporarily show a reduced insulation resistance in response to the rapid temperature rise. Under such severe operating conditions, preferably, the resin of the overcoat layer may not be readily decomposed during rapid temperature rise. Examples are aromatic polyamide, polyimide, polyamideimide, polyester-imide, polyhydantoin, polyester, polyparabanic acid, polysulfone, epoxide resins and phenoxy resins. Under mild conditions wherein any rapid temperature rise does not take place, or under conditions wherein temperature rises slowly or intermittently, polyurethane, fluoroplastic, polyolefin, aliphatic polyamide, polyvinyl formal or the like may be employed.

The overcoat layer may be formed by coating a solution of the resin in a suitable solvent to the composite coating layer, or by extruding the resin around the composite coating layer, or by spirally winding a thin tape of the resin around the composite coating layer. After tape winding is finished, a suitable adhesive may be applied to bond the overlapping portions of the tape. The tape used herein may be in the form of a film, woven fabric, or non-woven fabric. The resin tape may be placed along the composite coating layer longitudinally and rounded circumferentially so as to wrap the layer. The overcoat layer may preferably have a thickness of 1 to 100 μm. A thinner layer cannot endure the friction during mechanical working whereas a thicker layer occupies a larger space and tends to cause the composite coating layer to peel during decomposition of the resin if the resin is not readily decomposable.

The overcoat layer may be made of either a resin or mixtures of a plurality of resins. The overcoat layer is not limited to a single layer, but may be composed of a plurality of layers of the same or different resins in accordance with the final application of the wire. For example, improved softening and abrasion resistances may be achieved by first applying a resin having a high softening point such as polyimide to the composite coating layer surface and then applying another resin having good mechanical properties such as a polyamide-imide, polyvinyl formal or polyamide resin thereto. Furthermore, to improve the sliding property of the wire to facilitate coil winding, the overcoat layer may be coated with a lubricating layer of a material having a reduced coefficient of friction.

The heat-resistant electrically insulated wire as described in the foregoing may generally be mechanically worked, for example, by winding into a coil before it can be mounted in an electric equipment. Since the composite coating layer enclosing the conductor has not been fired into a ceramic layer and has a flexible resinous overcoat layer thereon, the instant wire may be wound into a small-diameter (for example self-diameter) coil as readily as the conventional organic enamel insulated wires. Further, the composite coating layer is not directly exposed to the outside, it will not be peeled off by the friction between adjacent wire portions or the wire and the support during coil winding. In addition, since any particular firing treatment is not carried out after mechanical working, such as coil winding, there is no risk that a wire support such as a bobbin is thermally deformed or oxidized during firing. When the instant wire is used or operated at approximately room temperature, that is, at a temperature far below the heat resistance temperature of the inorganic polymer or the overcoating resin, the composite coating layer is not converted into a ceramic and the overcoat layer remains intact thereon. Consequently, the wire has mechanical properties substantially equal to those of the conventional organic enamel insulated wire. This means that no peeling of the insulating coating will occur even when the wire is subject to mechanical vibration during operation. Further, it will be obvious that the wire has electrical properties substantially equal to those of the conventional magnet wires. Accordingly, the instant wire is considered comparable to the conventional magnet wires as long as it is used in electric equipment wherein normal operating temperature is below the heat resistance temperature of the inorganic polymer or overcoating resin.

The instant wire on use experiences a rapid, gradual, or intermittent temperature rise due to the abnormal operation of the associated equipment or the like.

When temperatures rises as a result of abnormal operation of electric equipment or the like, the overcoating resin is decomposed to leave the wire and the inorganic polymer in the composite coating layer is decomposed to form silica, composite oxides of silica and other oxides, and other inorganic products which all serve as a binder for the inorganic fine powder, thereby forming a fired ceramic layer. The thus formed ceramic layer has good electrical properties, particularly good electrical insulation properties at elevated temperatures, which allow the wire to be used without interruption in the case of rapid temperature rise. The selection of an overcoating resin permits the wire to be used from a usual operating temperature approximating room temperature to an elevated temperature above the heat-resistance temperature of the resin without any sudden reduction of the necessary electrical insulation properties. It is a feature of this invention that since the inorganic polymer is contained in the composite coating layer and is decomposed at an elevated temperature into an inorganic product which serves as a binder for the inorganic powder, the wire does not require any particular binder such as a frit which is sintered or softened and melted approximately at the decomposition temperature of the resin, and consequently, a firmly bonded ceramic layer is formed when the wire is heated at an elevated temperature. Since the inorganic polymer evolves a less amount of gases during thermal decomposition than usual organic polymer, peeling will hardly occur in the composite coating layer and the electrical properties will not be adversely affected even when the wire has an overcoat layer of a less decomposable resin, for example, a polyimide, polyparabanic, aromatic polyamide or polyamide-imide resin.

The invention will be more fully understood with reference to the following Examples, which should not be construed as limiting the invention. Parts are by weight.

EXAMPLE 1

In a ball mill were admitted 100 parts of alumina fine powder particles having a size of 1–6 μm and 90 parts of Silicone Varnish TSR 116 (trademark, silicone resin manufactured and sold by Toshiba Silicone Co., Ltd.; resin content 50%). The contents were mixed for about 4 hours, obtaining a slurry. A nickel-plated copper conductor having a diameter of 0.5 mm was immersed in the slurry bath and passed through a die opening to form a coated conductor which was then heated for 20 seconds in an oven at a temperature of 375° C. to cure the silicone resin, obtaining a composite coating layer having a thickness of 0.020 mm. The composite coating layer was further coated with a polyimide to a thickness of 0.010 mm, eventually obtaining a heat resistant electrically insulated wire having an outer diameter of 0.56 mm.

EXAMPLE 2

As described in Example 1, a nickel-plated copper conductor having a diameter of 0.5 mm was provided with a composite coating layer having thickness of 0.020 mm. A polyurethane resin overcoat was then applied to the composite coating layer to a thickness of 0.010 mm, obtaining an insulated wire having an outer diameter of 0.56 mm.

EXAMPLE 3

A nickel-plated copper conductor having a diameter of 0.5 mm was primed with silicone varnish TRS 116 to form a silicone layer having a thickness of 3 μm. Thereafter, a slurry as prepared in Example 1 was applied to form a composite coating layer having a thickness of 0.020 mm. Further, the conductor was coated with polyimide to a thickness of 0.010 mm, and then with polyamide-imide to a thickness of 0.008 mm. The thus prepared wire had an outer diameter of 0.582 mm.

COMPARATIVE EXAMPLE 1

A copper conductor having a diameter of 0.5 mm was coated with an imide resin, obtaining an insulated wire having an outer diameter of 0.56 mm. This insulated wire is a typical example of conventional magnet wires.

COMPARATIVE EXAMPLE 2

A nickel-plated copper conductor having a diameter of 0.5 mm was coated with a mixture as described in Example 1 to a thickness of 0.020 mm, forming a composite coating layer on the conductor. In this comparative example, no resin overcoat was applied to the composite coating layer.

Various tests were performed on the wires prepared in Examples 1, 2 and 3 and Comparative Examples 1 and 2. The results are shown in Table I.

TABLE I

| | Example 1 | Example 2 | Example 3 | Comparative Example 1 | Comparative Example 2 |
|---|---|---|---|---|---|
| Conductor | | | | | |
| Material | Ni-plated Cu | Ni-plated Cu | Ni-plated Cu | Cu | Ni-plated Cu |
| Diameter (mm) | 0.5 | 0.5 | 0.5 | 0.5 | 0.5 |
| Composite coating layer | | | | | |
| Material | silicon + alumina | silicon + alumina | silicon + alumina | — | silicon + alumina |
| Thickness (mm) | 0.020 | 0.020 | 0.020 | | 0.020 |
| Overcoat | | | | | |
| Resin | polyimide | polyurethane | polyimide + polyamide-imide | polyimide | — |
| Thickness (mm) | 0.010 | 0.010 | 0.010 + 0.008 | 0.030 | |
| Final outer diameter (mm) | 0.56 | 0.56 | 0.582 | 0.56 | 0.54 |
| Results | | | | | |
| Pin hole | none | none | none | none | found |
| Flexibility test | | | | | |
| × 1 | 0/3 | 3/3 | 0/3 | 0/3 | 3/3 |
| × 2 | 0/3 | 1/3 | 0/3 | 0/3 | 3/3 |
| × 3 | 0/3 | 0/3 | 0/3 | 0/3 | 3/3 |
| × 4 | 0/3 | 0/3 | 0/3 | 0/3 | 3/3 |
| Breakdown voltage, 25° C. | AC 4.5kV | AC 4.0kV | AC 4.7kV | AC 9.0kV | — |
| Softening temp. | >500° C. | 250° C. | >500° C. | >500° C. | — |
| Single scrape test | 850 g | 650 g | 1020 g | 1500 g | 250 g |

In Table I, "pin hole" designates the presence or absence of pin holes of the insulating coating, that is, composite coating layer and/or overcoat layer. In flexibility test, "x1", "x2", "x3" and "x4" designate the ratio of the diameter of a bobbin on which the wire is wound to the final outer diameter of the insulated wire and the values designate the number of rejected samples/3 samples. "Softening temperature" designates the softening temperature of the insulating coating. "Single scrape test" designates the minimum load in the single scrape test for examining abrasion resistance.

As seen from the results of Table I, the heat-resistant insulated wire of Example 1 shows a high flexibility substantially equal to that of the usual magnet wire (Comparative Example 1). The wire of Example 1 is somewhat inferior to the usual wire in dielectric breakdown voltage at room temperature and abrasion resistance, but is satisfactory in actual applications. The wire of Example 2, which is inferior to the wire of Example 1 in flexibility is significantly improved over the wire of Comparative Example 2 having no resinous overcoat layer and is still satisfactory in actual applications.

Stranded wire samples each consisting of two wires of Examples 1, 2 and 3 and Comparative Example 1, respectively, were prepared. Dielectric breakdown voltage at an elevated temperature of 600° C. was measured. As the ambient temperature was gradually increased from room temperature (20° C.) to an elevated temperature of 650° C., the insulation resistance of these samples was measured at given temperatures. The results are shown in Table II. With respect to Examples 1, 2 and 3, the results are shown for both samples which had not been subjected to artificial firing treatment before the test (the invention) and samples which had been peviously fired to convert the composite coating layer into a ceramic layer. The firing treatment was carried out by gradually heating samples within the temperature range from 200° C. to 650° C.

TABLE II

| | Ceramic layer thickness after firing | Dielectric breakdown voltage, 600° C. | Insulation resistance (ohm) 20° C. | 100° C. | 200° C. | 300° C. | 400° C. | 500° C. | 550° C. | 600° C. | 650° C. |
|---|---|---|---|---|---|---|---|---|---|---|---|
| Example 1 | | | | | | | | | | | |
| non-fired | — | AC 260V | $>10^{10}$ | $>10^{10}$ | $>10^{10}$ | $4.5 \times 10^8$ | $3.9 \times 10^7$ | $6.0 \times 10^6$ | $2.8 \times 10^6$ | $1.8 \times 10^6$ | $1.2 \times 10^6$ |
| fired | 0.018 mm | AC 260V | $10^7$ | $>10^{10}$ | $>10^{10}$ | $4 \times 10^8$ | $2.5 \times 10^7$ | $1.1 \times 10^7$ | $8 \times 10^6$ | $5 \times 10^6$ | $2 \times 10^6$ |
| Example 2 | | | | | | | | | | | |
| non-fired | — | AC 255V | $>10^{10}$ | $>10^{10}$ | $10^9$ | $1.8 \times 10^8$ | $7.0 \times 10^7$ | $3.0 \times 10^7$ | $2.4 \times 10^6$ | $1.9 \times 10^6$ | $1.3 \times 10^6$ |
| fired | 0.018 mm | AC 270V | $10^7$ | $>10^{10}$ | $>10^{10}$ | $2.2 \times 10^8$ | $8 \times 10^7$ | $3.3 \times 10^7$ | $9 \times 10^6$ | $4 \times 10^6$ | $2.3 \times 10^6$ |
| Example 3 | | | | | | | | | | | |
| non-fired | — | AC 263V | $>10^{10}$ | $>10^{10}$ | $>10^{10}$ | $4.2 \times 10^8$ | $4.0 \times 10^7$ | $9.4 \times 10^6$ | $5 \times 10^6$ | $2.3 \times 10^6$ | $1.5 \times 10^6$ |
| fired | 0.019 mm | AC 275V | $10^7$ | $>10^{10}$ | $>10^{10}$ | $5 \times 10^8$ | $8 \times 10^7$ | $2 \times 10^7$ | $9.3 \times 10^6$ | $5 \times 10^6$ | $3.8 \times 10^6$ |
| Comparative Example 1 | — | — | $>10^{10}$ | $>10^{10}$ | $>10^{10}$ | $3 \times 10^8$ | $2.6 \times 10^7$ | $3 \times 10^6$ | $6 \times 10^5$ | broken | — |

Table II reveals that the conventional organic enamel insulated wire (Comparative Example 1) shows a sudden reduction of insulation resistance at 500° C. or higher and fails at 600° C. whereas the non-fired wires of Examples 1, 2 and 3 do not show any significant reduction of insulation resistance from 20° C. to an elevated temperature of 650° C. and are satisfactory in practical applications. The non-fired wires of Examples 1, 2 and 3 are comparable to the fired wires of the same Examples in the high-temperature range. This indicates that the composite coating layer which has not previously been fired is converted into a ceramic layer when exposed to high temperatures after mounting or during use.

Two non-fired wires of Example 1 having the imide resin overcoat and Example 2 having the urethane resin overcoat, respectively, are twisted into a stranded wire with 12 twists per 12 cm of the wire. These stranded wires were rapidly heated by placing them in an oxidizing atmosphere at 600° C. The insulation resistance of wires was measured at intervals. The results are plotted in the FIGURE wherein the abscissa designates the heating time in terms of minute and the ordinate designates the insulation resistance in terms of ohm. Curve A shows the insulation resistance of the polyimide overcoated wire of Example 1 and curve B shows that of the polyurethane overcoated wire of Example 2. These curves reveal that the polyurethane overcoated wire experiences a temporary sudden reduction of insulation resistance during rapid heating whereas the polyimide overcoated wire does not.

In the most preferred embodiment of a heat-resistant electrically insulated wire according to this invention, the overcoat layer circumferentially encloses the underlying composite coating layer in substantially non-adhered relationship. Heat-resistant electrically insulated wires of this arrangement exhibit the best workability and high-temperature performance for the following reason. In the composite coating layer applied to the conductor, the inorganic polymer serves as a binder for inorganic fine powder particles. During winding of the wire, a portion of the binder resin is extended between inorganic fine powder particles at the outer periphery of the wound wire or coil. Cracks will occur in the composite coating layer when the binder resin is extended to an excessive extent for some reason. If the composite coating layer is firmly adhered to the overcoat layer, cracks in the composite coating layer surface will induce cracks in the overcoat layer. This is a problem because the wire should be worked before use in every application. One solution to this problem is to select a resin for the overcoat layer which is tough and has a remarkably improved extensibility over the binder resin (for example, silicone resin) of the composite coating layer. The resin which can be used in the overocat layer is so restricted that difficulty is imposed on selection of a resin best suited for the final application of the wire. The binder resin of the composite coating evolves decomposition gases when exposed to elevated temperatures during abnormal operation as described above. With the composite coating layer firmly adhered to the overcoat layer, the overcoat layer prevents decomposition gases from escaping. The decomposition gases remaining inside the overcoat layer shows a sudden pressure increase upon rapid heating of the wire, thereby causing the overcoat and composite coating layers to be locally blown off. Consequently, the conductor is locally exposed to the outside giving rise to the risk of short-circuit. To overcome the above problem, the overcoat layer should not be firmly adhered to the composite coating layer. Differently speaking, the overcoat layer encloses the composite coating layer so that the layers may be independently deformed when the wire is subject to a mechanical stress as by extending or winding. Provision of the layers for independent deformation is referred to as "non-adhered relationship" herein. The arrangement of the overcoat layer on the composite coating layer in substantially non-adhered relationship allows the composite coating layer to be extended at the outer periphery of the coil and the overcoat layer to be extended independent of the underlying composite coating layer when the wire is wound into a coil. Cracks in the composite coating layer, if occur, will not induce any cracks in the overcoat layer insofar as the extent of deformation of the wire does not exceed the deformation limit of a resin forming the overcoat layer. Accordingly, heat-resistant electrically insulated wires arranged in the above fashion have a remarkable workability and may be wound into a small-diameter coil as are conventional magnet wires. Resins required for the overcoat layer in this non-adhered arrangement may have somewhat low extensibility and toughness without any substantial reduction in workability as compared with resins required for the overcoat layer firmly adhered to the composite coating layer. Accordingly, a wider variety of resins may be used in a mixture of the overcoat layer and a resin best suited for the final application of the wire may be readily selected. Even if the resin of the overcoat layer has not been decomposed or eliminated after decomposition of the binder (such as inorganic polymers) in the composite coating layer and conversion of the composite coating layer into a ceramic layer at elevated temperatures during abnormal operation or the like, decomposition gases from the composite coating layer may be trapped between the composite coating layer and the overcoat layer. There will be little risk that decomposition gases blow off the overcoat and composite coating layers to expose the conductor when decomposition proceeds fast due to rapid temperature rise. Accordingly, the resin for the overcoat layer may be selected in accordance with the final application of the wire. For example, use may be made of a heat-resistant resin which is not readily decomposable.

The above-mentioned substantially "non-adhered" arrangement of the overcoat and composite coating layers is characterized in that the overcoat layer is provided on the composite coating layer in a sleeve-like form, or that the overcoat layer is partially adhered to the composite coating layer and the remaining portion of the overcoat layer is not adhered thereto, or that the overcoat layer is adhered to the composite coating layer at a very low bond strength.

The above-mentioned substantially "non-adhered" arrangement of the overcoat and composite coating layers may be achieved by applying to the composite coating layer a resin having a poor adhesion to the composite coating layer, for example, polyimide, Teflon, polyamide-imide or other resins when the inorganic polymer of the composite coating layer is a silicone resin. In this case, tension to the conductor will assist in non-adhered provision of a resin overcoat. Alternatively, the composite coating layer may be coated with lubricating powder, for example, inorganic powder such as BN, $MoS_2$, $MoS_3$, $WS_2$, PbO, silicon nitride, fluorographite, graphite and mica or organic powder such as fluoroplastic before the overcoat layer is applied to or extruded around the composite coating layer. In a further embodiment, a tape of a suitable resin may be wound on the composite coating layer to form an overcoat layer. The tape may be under a controlled tension during winding so that the wound tape may not firmly fit on the composite coating layer. The overcoat layer may also be formed by wrapping the underlying layer with a tape. A tape having a plurality of projections on the inner surface may also be used. After winding or wrapping, the overlapping portions of the tape may preferably be bonded by any suitable methods. In a still further embodiment, the conductor having the composite coating layer thereon may be inserted into a sleeve to form a heat-resistant insulated wire, particularly, of a short length. In some cases, an auxiliary layer may be interposed between the composite coating layer and the overcoat layer. The auxiliary layer should not be adhesive at least to one of the composite coating and overcoat layers. Then the overcoat layer is held in non-adhered relationship to the composite coating layer.

Examples 4–11 are heat-resistant insulated wires having overcoat and composite coating layers in non-adhered relationship and Comparative Example 3 is that having overcoat and composite coating layers adhered to each other.

EXAMPLE 4

A nickel-plated copper conductor having a diameter of 1.0 mm was immersed in a slurry of 100 parts of alumina powder having an average particle size of 5 μm and 35 parts of methylphenylsilicone resin in 35 parts of xylene and then passed through an oven for 20 seconds at a temperature of 375° C. to cure the silicone resin. This procedure was repeated several times until the composite coating layer reached a thickness of 0.02 mm. While tensioned at an extensibility of about 1%, the conductor was further continuously coated with a polyimide resin and then cured to form an overcoat layer having a thickness of about 20 μm. The thus obtained heat-resistant insulated wire had final outer diameter of 1.038 mm.

EXAMPLE 5

A conductor was coated with a composite coating layer in the same manner as described in Example 4. The conductor was further coated with a polyimide resin to a thickness of 12 μm and then with a polyvinyl formal to a thickness of 8 μm. Curing resulted in a heat-resistant insulated wire having a final outer diameter of 0.038 mm.

EXAMPLE 6

A nickel-plated copper conductor having a diameter of 1.0 mm was immersed in a slurry of 50 parts of alumina powder having an average particle size of 5 μm, 50 parts of glass frit having a softening point of 900° C. and 30 parts of methylphenylsilicone resin in 35 parts of xylene and then passed through an oven for 25 seconds at a temperature of 375° C. to cure the silicone resin. This procedure was repeated several times until the composite coating layer reached a thickness of about 18 μm. Boron nitride (BN) powder was applied to the composite coating layer. While tensioned at an extensibility of about 2%, the conductor was further coated with a polyamide-imide resin and then cured to form an overcoat layer having a thickness of 15 μm. The thus obtained heat-resistant insulated wire had a final outer diameter of 1.031 mm.

EXAMPLE 7

A nickel-plated copper conductor having a diameter of 1 mm was coated with a silicone resin layer having a thickness of 3 μm before it was coated with a composite coating layer having a thickness of 20 μm in the same manner as described in Example 6. A polyethylene film having a thickness of 50 μm was wound on the conductor and heated at a temperature of 200° C. to fuse and bond the overlapping portions of the film, completing an overcoat layer. A heat-resistant insulated wire was thus obtained.

EXAMPLE 8

A nickel-plated copper conductor having a diameter of 1 mm was coated with a composite coating layer in the same manner as described in Example 6. A polyamide-imide resin film having a thickness of 15 μm was wound on the conductor. A polyamide-imide varnish was applied to the wound film. Curing was carried out to complete the overcoat layer. A heat-resistant insulated wire was thus obtained.

EXAMPLE 9

A nickel-plated copper conductor having a diameter of 1 mm was coated with a mixture of 300 parts of silica/alumina (1/1), 280 parts of methyl-phenyl type silicone varnish (resin content 55 wt%) and 45 parts of xylene, and then heated to a temperature of 400° C. for 25 seconds to cure the silicone, forming a composite coating layer having a thickness of 0.020 mm. Polyparabanic acid varnish was applied on the composite coating layer and dried by heating, obtaining a wire having a 15 μm overcoat layer on the composite coating layer.

EXAMPLE 10

A nickel-plated copper conductor having a diameter of 1 mm was coated with a mixture of 100 parts of alumina/kaolin (80/20), 100 parts of silicon alkyd varnish (resin content 50 wt%) and 20 parts of xylene, and then heated for 25 seconds to a temperature of 400° C. to cure the silicone, forming a composite coating layer having a thickness of 0.020 mm. A polyimide overcoat layer having a thickness of 12 μm was formed on the composite coating layer as described in Example 4, obtaining a heat-resistant insulated wire.

EXAMPLE 11

A nickel-plated copper conductor having a diameter of 1.0 mm was coated with a mixture of 200 parts of alumina/silica (50/50), 140 parts of methylphenylsilicone varnish (resin content 50 wt%) and 30 parts of xylene, and then heated for 30 seconds to a temperature of 350° C. to cure the silicone, forming a first composite coating layer having a thickness of 0.012 mm. A second composite coating layer having a thickness of 0.010 mm was formed on the first layer using a mixture of 200 parts of alumina, 180 parts of silicon polyester varnish and 30 parts of xylene. The total thickness of the first and second composite coating layer was 0.022 mm. A polyimide overcoat layer having a thickness of 12 μm was formed on the second composite coating layer as described in Example 4, obtaining a heat-resistant insulated wire.

COMPARATIVE EXAMPLE 3

A conductor was coated with a composite coating layer in the same manner as described in Example 4. The conductor was further coated with a polyurethane layer having a thickness of 15 μm. The thus obtained heat-resistant insulated wire had a final outer diameter of 1.035 mm.

Heat-resistant insulated wire sample prepared in Examples 4–11 and Comparative Example 3 were tested for flexibility and heat resistance. The appearance and behavior of overcoat layers were also examined. The results are shown in Table III.

The flexibility was determined by winding a wire on a bobbin having the self-diameter as the wire with or without 20% extension of the wire. The values in "flexibility" designate the number of rejected samples/20 samples.

The heat resistance of a sample upon rapid heating was evaluated as follows. Two wires of the same Examples were twisted into a stranded sample. The samples were placed in ovens at the indicated temperatures. After the overcoating resin was completely decomposed and eliminated, the composite coating layer was observed whether blow-off occurred or not. Mark "  " designates the absence of blow-off of the composite coating layer, "Δ" designates partial blow-off, and "×" designates serious blow-off and consequent conductor exposure.

during abnormal operation or the like. The reason will be explained below.

If an overcoating resin is readily softenable or fusible at elevated temperatures or shrinkable during thermal cycling, the overcoat layer which is initially formed on the composite coating layer in non-adhered relationship will soften, flow or shrink during thermal cycling, substantially adhering to the composite coating layer. The adhered overcoat layer prevents release of gases resulting from decomposition of the binder resin (inorganic polymer) in the composite coating layer in the course of conversion of the composite coating layer into a ceramic layer. In this condition, sudden exposure to elevated temperatures will lead to peeling or blow-off of the composite coating layer from the conductor, exposing the conductor. If the overcoat layer is made of a mixture of an organic resin and an inorganic powder and formed on the composite coating layer in non-adhered relationship, the inorganic powder admixed

TABLE III

| | Flexibility | | | | | | | | | | | |
|---|---|---|---|---|---|---|---|---|---|---|---|---|
| | Winding test of self diameter | Winding test of self diameter after extended 20% | Thermal Cut through temperature (load 0.8kg, JIS C3003) | Heat resistance upon rapid heating 650° C. | 600° C. | 550° C. | 500° C. | 450° C. | 400° C. | 350° C. | Appearance of overcoat layer of two wires twisted | Overcoat layer upon rapid extension |
| Example 4 | 0/20 | 0/20 | >500° C. | O | O | O | O | O | O | O | wrinkle | removed as sleeve |
| Example 5 | 0/20 | 0/20 | >500° C. | O | O | O | O | O | O | O | " | removed as sleeve |
| Example 6 | 0/20 | 0/20 | >500° C. | O | O | O | O | O | O | O | " | removed as sleeve |
| Example 7 | 0/20 | 0/20 | 110° C. | Δ | Δ | O | O | O | O | O | " | removed as sleeve |
| Example 8 | 0/20 | 0/20 | >500° C. | O | O | O | O | O | O | O | " | removed as sleeve |
| Example 9 | 0/20 | 0/20 | >500° C. | O | O | O | O | O | O | O | " | removed as sleeve |
| Example 10 | 0/20 | 0/20 | >500° C. | O | O | O | O | O | O | O | " | removed as sleeve |
| Example 11 | 0/20 | 0/20 | >500° C. | O | O | O | O | O | O | O | " | removed as sleeve |
| Comparative Example 3 | 20/20 | — | 170° C. | X | X | X | X | X | O | O | no wrinkle | cracking and partial peeling of composite coating layer |

As apparent from the results of Table III, the wires having the overcoat layer in non-adhered relationship to the composite coating layer not only have a sufficient flexibility to pass the test of winding a wire on a bobbin having the self diameter as the wire after 20% extension as to the conventional magnet wires, but also are effective in preventing the composite coating layer from being peeled or blown off during rapid temperature rise. On the contrary, somewhat unsatisfactory flexibility and high-temperature performance are found in the wires of Comparative Example 3 in which the overcoat layer is firmly adhered to the underlying composite coating layer and made of a readily decomposable resin.

The overcoat layer which is provided on the composite coating layer in substantially non-adhered relationship may be made of an organic resin or mixtures thereof. Such a resin may preferably be used in admixture with an inorganic powder to improve the properties of the overcoat layer upon rapid temperature rise acts to prevent the resin from softening, flowing or shrinking when the binder of the composite coating layer is rapidly decomposed as a result of sudden exposure to elevated temperatures. Consequently, the non-adhered relationship is maintained between the composite coating layer and the overcoat layer and decomposition gases are trapped therebetween. Peeling or blow-off of the composite coating layer is thus prevented.

Examples of the inorganic powders which may be used in the overcoat layer are oxides such as $Al_2O_3$, $BaTiO_3$, $CaTiO_3$, $PbTiO_3$, $ZrSiO_4$, $BaZrO_3$, $MgSiO_3$, $SiO_2$, BeO, $ZrO_2$, MgO, clay, bentonite, montmorillonite, kaolin, glass frit, mica, etc., nitrides such as BN and silicon nitride, $MoS_2$, $MoS_3$, $WS_2$, PbO, fluorographite, graphite and the like, and mixtures thereof. The particle size of the inorganic powder particles may be dependent on the diameter of a conductor although the preferred size is equal to or less than 10 μm. The inorganic powder may be blended with the organic resin in a varying ratio in consideration of the mechanical and thermal properties of the resultant mixture such as winding property and heat resistance. Preferably, 0.1–50 parts by weight of the inorganic powder may be blended with 100 parts by weight of the organic resin. Larger amounts of the inorganic powder will result in a poor flexibility while smaller amounts will result in insufficient prevention of flow of the overcoat layer at elevated temperatures so that the composite coating layer may be blown off.

The overcoat layer of a mixture of an organic resin and an inorganic powder may be applied on the composite coating layer in non-adhered relationship in the same manner as described with reference to the overcoat layer solely composed of a resin. The overcoat layer of such a mixture may also preferably have a thickness of 1–100 μm. The organic resin which can be used in admixture with the inorganic powder in the overcoat layer may be selected from the group enumerated with reference to the overcoat layer solely composed of a resin. Since the inorganic powder prevents the resin from softening, flowing or shrinking at elevated temperature, resins having relatively low heat-resisting properties or easily shrinkable resins, for example, polyurethane may additionally be used without any problem. The overcoat layer may be of either of a single or a multiple layer structure depending on the final application of the wire. The overcoat layer may also be composed of a plurality of layers of different resins. For example, thermal softening and abrasion resistances may be improved by first applying a mixture of a high-softening point resin such as polyimide and a powdery inorganic compound to the composite coating layer surface and then applying another mixture of a mechanically improved resin such as polyamideimide, polyvinyl formal or polyamide and a powdery inorganic compound. A further multi-layer structure may be employed which consists of resinous layers and resin-inorganic powder mixture layers alternately placed on top of the other.

In the foregoing description with respect to the inorganic polymers for use in the composite coating layer, reference is made to those which are slowly decomposed above their heat resistance temperature. When the overcoat layer of a mixture of a powdery inorganic compound and an organic resin is provided on the composite coating layer in non-adhered relationship and hence, decomposition gases from the composite coating layer is trapped therebetween, the use of an easily decomposable silicone resin such as dimethylsilicone in the composite coating layer will not cause the composite coating layer to be peeled or blown off upon rapid temperature rise.

The following examples are heat-resistant insulated wires having an overcoat layer of a mixture of an inorganic powder and an organic resin on the composite coating layer in non-adhered relationship according to this invention. Wires having an overcoat layer solely composed of an organic resin on the composite coating layer in non-adhered relationship are also prepared for comparison.

EXAMPLE 12

A nickel-plated copper conductor having a diameter of 1.0 mm was immersed in a slurry of 100 parts of alumina powder having an average particle size of 5 μm and 35 parts of methylphenylsilicone resin in 35 parts of xylene and then passed through an oven for 30 seconds at a temperature of 350°–400° C. to cure the silicone resin. This procedure was repeated several times until the composite coating layer reached a thickness of 0.02 μm. A film of a mixture of 100 parts of polyurethane and 15 parts of alumina and having a thickness of 0.02 μm was wound on the conductor. A polyurethane varnish was applied to the wound film. Curing was carried out to bond the overlapping portions of the film, completing a heat-resistant insulated wire having the overcoat layer formed on the composite coating layer in non-adhered relationship.

EXAMPLE 13

A conductor was coated with a composite coating layer in the same manner as described in Example 12. While tensioned at an extendibility of about 1%, the conductor was continuously coated with a mixture of 100 parts of polyimide and 5 parts of aerogel and then cured to form an overcoat layer having a thickness of about 20 μm. The thus obtained heat-resistant insulated wire had a final outer diameter of 1.080 mm.

EXAMPLE 14

A nickel-plated copper conductor having a diameter of 1 mm was provided with a silicone layer having a thickness of 3 μm. The conductor was immersed in a slurry of 40 parts of alumina powder having an average particle size of 5 μm, 60 parts of glass frit having a softening point of 900° C. and 30 parts of methylphenylsilicone resin in 35 parts of xylene and then passed through an oven at a temperature of 375° C. to cure the silicone resin. This procedure was repeated several times until the composite coating layer reached a thickness of 20 μm. A film of a mixture of 100 parts of nylon and 3 parts of BN and having a thickness of 13 μm was wound on the conductor. A nylon varnish was applied to the wound film. Heating was carried out to bond the overlapping portions of the film, completing a heat-resistant insulated wire having the overcoat layer formed on the composite coating layer in non-adhered relationship.

COMPARATIVE EXAMPLE 4

A conductor having a composite coating layer formed thereon as described in Example 12 was further provided with a polyurethane overcoat layer by winding an urethane film having a thickness of 17 μm thereon. The thus obtained heat-resistant insulated wire had the overcoat layer of urethane on the composite coating layer in non-adhered relationship.

Heat-resistant insulated wire samples prepared in Examples 12–14 and Comparative Example 4 were tested for flexibility and heat resistance. The results are shown in Table IV. Test methods and evaluation are the same as in Table III.

Table IV

| | Flexibility Self diameter winding | Thermal softening resistance (load 0.8 kg, JIS C3003) | Heat resistance upon rapid heating 650° C. | 600° C. | 550° C. | 500° C. | 450° C. | 400° C. | 350° C. |
|---|---|---|---|---|---|---|---|---|---|
| Example 12 | 0/20 | 190° C. | Δ | Δ | O | O | O | O | O |
| Example 13 | 0/20 | >500° C. | O | O | O | O | O | O | O |
| Example 14 | 0/20 | 200° C. | Δ | Δ | O | O | O | O | O |
| Comparative Example 4 | 0/20 | 170° C. | Δ | Δ | Δ | Δ | O | O | O |

As apparent from the results of Table IV, the wires having the inorganic powder containing overcoat layer in non-adhered relationship to the composite coating layer not only have a sufficient flexibility to pass the test of winding on a bobbin with the self diameter as do the conventional magnet wires, but also are effective in preventing the composite coating layer from being peeled or blown off during rapid temperature rise. The wires having the overcoat layer solely composed of a softenable or fusible resin in non-adhered relationship to the composite coating layer show somewhat poor high-temperature performance although they have a sufficient flexibility.

As described in the foregoing, the heat-resistant electrically insulated wires of this invention are different from those of the prior art in that the composite coating layer essentially consisting of an inorganic polymer and an inorganic fine powder has not been fired into a ceramic layer by any artificial treatment and is adapted to be converted into a ceramic layer when exposed to elevated temperatures during use. There is no risk that a wire support such as a bobbin is deformed or oxidized by a firing treatment as in the prior art. Further, the provision of an overcoat layer mainly consisting of a flexible resin on the composite coating layer facilitates mechanical working, for example, coil winding of the wire. As long as the operating or ambient temperature is below the heat resistance temperature, the wires of this invention can be used under mechanical vibration for a prolonged period of time as in the case of conventional magnet wires. Further, the wires of this invention can be used without interruption at elevated temperatures during abnormal operation since the composite coating layer is converted into a ceramic layer at such elevated temperatures, preventing a sudden reduction of electrical insulation properties.

Where the overcoat layer is provided on the composite coating layer in non-adhered relationship, the resulting wire can be more easily wound into a coil. In addition, a variety of resins may be used in the overcoat layer since the non-adhered arrangement prevents the exposure of the conductor by decomposition gases resulting from conversion of the composite coating layer into a ceramic layer. Accordingly, the resin may be selected so as to meet the final application of the wire, ensuring improved properties of the wire. The addition of an inorganic powder to the overcoat layer further improves the properties, particularly the high-temperature performance of the wire and spreads the range of resins to be selected.

The heat-resistant electrically insulated wires of this invention find particular applications in super thermal resistant motors, thermal resistant electromagnets, transformers and other coil parts, and electrical equipment for aircrafts, rockets, automobiles or the like. They may also be used as refractory wires, hightemperature wirings or the like.

What is claimed is:

1. A heat-resistant electrically insulated wire comprising a conductor, at least one composite coating layer circumferentially enclosing the conductor, said composite coating layer being a mixture comprising an inorganic fine powder selected from the group consisting of $Al_2O_3$, $BaTiO_3$, $CaTiO_3$, $PbTiO_3$, $ZrSiO_4$, $BaZrO_3$, $MgSiO_3$, $SiO_2$, BeO, $ZrO_2$, MgO, clay, kaolin, bentonite, montmorrilonite, glass frit, mica, BN and silicon nitride, and mixtures thereof and an inorganic polymer selected from the group consisting of silicone resins; modified silicone resins; inorganic polymers having a skeleton comprising silicone, oxygen and one or more elements selected from the group consisting of C, Ti, B, Al, N, P, Ge, As and Sb and mixtures thereof, and at least one overcoat layer of a flexible organic resin circumferentially enclosing said composite coating layer in a sleeve-like non-adhered relationship, said organic resin being selected from the group consisting of a polyimide, a polyamide-imide, a polyester-imide, a polyhydantoin, a polyester, a polyparabanic acid, an aromatic polyamide, an aliphatic polyamide, a polyurethane, a fluoroplastic, a polyolefin, a polyvinyl formal, a polysulfone, an epoxide resin, a phenoxy resin, and mixtures thereof, wherein said composite coating layer has not artificially been fired and is adapted to be converted into a ceramic layer when exposed at elevated temperatures during use.

2. A heat-resistant electrically insulated wire according to claim 1 wherein said inorganic fine powder is not softened at the decomposition temperature of said inorganic polymer and has improved electrical insulating properties.

3. A heat-resistant electrically insulated wire according to claim 1 wherein said conductor is selected from the group consisting of copper, nickel-plated copper, nickel alloy-plated copper, silver-plated copper, silver alloy-plated copper, nickel-clad copper, stainless steel-clad copper, silver, silver alloy, platinum, gold and nichrome conductors.

4. A heat-resistant electrically insulated wire according to claim 1 wherein said overcoat layer further includes 0.1–50 parts by weight of an inorganic powder per 100 parts by weight of the organic resin, said inorganic powder selected from the group consisting of $Al_2O_3$, $BaTiO_3$, $CaTiO_3$, $PbTiO_3$, $ZrSiO_4$, $BaZrO_3$, $MgSiO_3$, $SiO_2$, BeO, $ZrO_2$, MgO, BN, clay, silicon nitride, kaolin, bentonite, glass frit, montmorillonite, $MoS_2$, $MoS_3$, $WS_2$, PbO, fluorographite, graphite and mica, and mixtures thereof.

5. A heat resistant electrically insulated wire according to claim 1 which further comprises a thin intermediate layer of an inorganic polymer selected from the group consisting of silicone resins; modified silicone resins; inorganic polymers having a skeleton comprising silicon, oxygen and one or more elements selected from the group consisting of C, Ti, B, Al, N, P, Ge, As and Sb and mixtures thereof between the conductor and the composite coating layer.

6. A heat-resistant electrically insulated wire according to claim 43 wherein said composite coating layer consists essentially of 100 parts by weight of said inorganic fine powder and 20–60 parts by weight of said inorganic polymer.

* * * * *